May 15, 1956     R. E. McGILL     2,745,693
FISHING TOOLS

Filed April 17, 1952     2 Sheets-Sheet 1

Inventor
Robert E. McGill
By Wilfred Lawson
ATTY

May 15, 1956    R. E. McGILL    2,745,693
FISHING TOOLS
Filed April 17, 1952    2 Sheets-Sheet 2
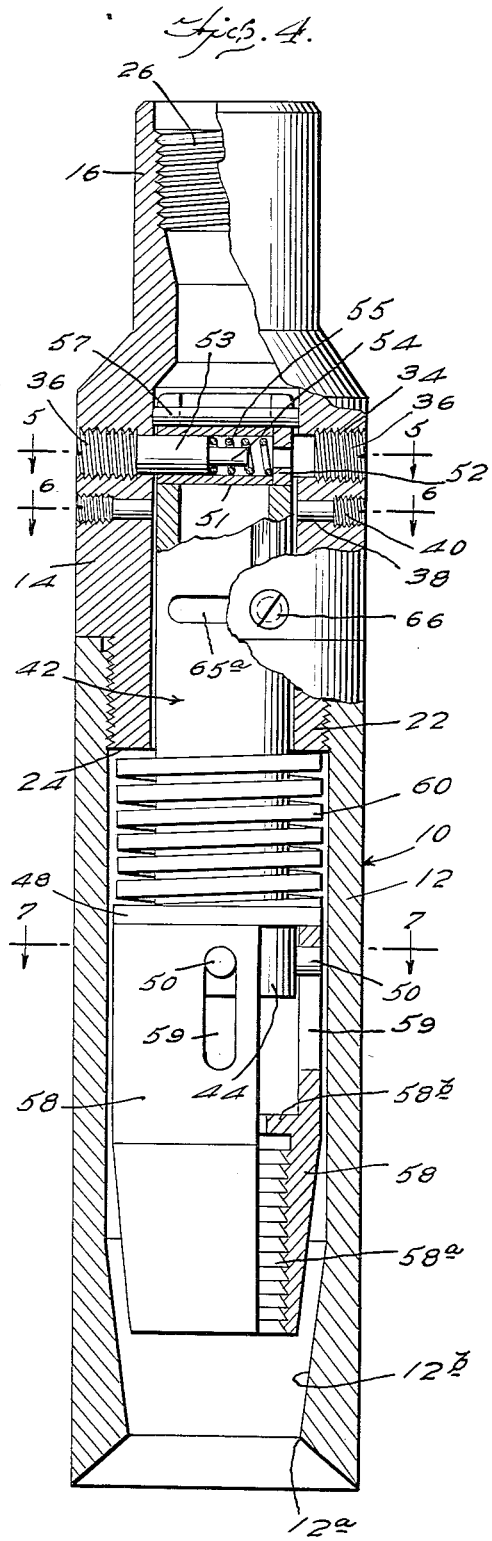
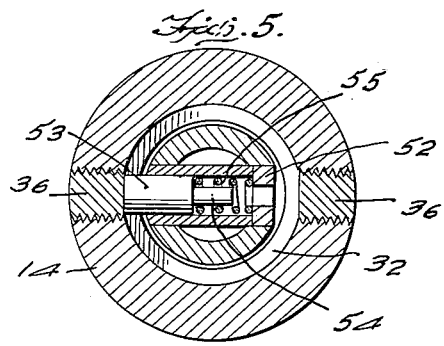
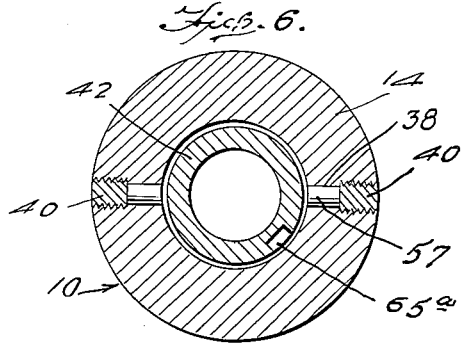
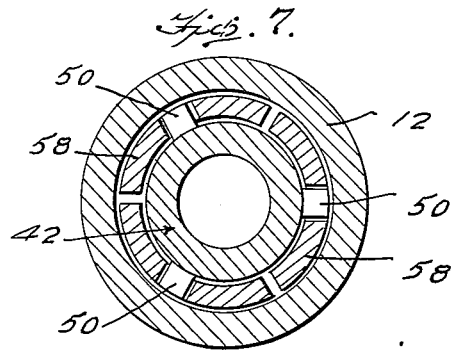
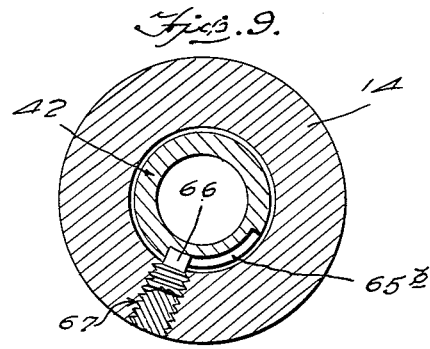
Inventor
Robert E. McGill
By Wilfred E. Lawson
ATTY

United States Patent Office 2,745,693
Patented May 15, 1956

2,745,693

FISHING TOOLS

Robert E. McGill, Bakersfield, Calif.

Application April 17, 1952, Serial No. 282,775

2 Claims. (Cl. 294—102)

This invention relates generally to the class of well drilling and is directed particularly to improvements in fishing tools.

An object of the present invention is to provide an improved deep well fishing tool of the overshot type having novel releasing means whereby the operator of the tool can release the fish without difficulty if such action becomes necessary.

Another object of the invention is to provide a fishing tool with novel means for releasing the fish, wherein the tool is designed in a novel manner to facilitate its use when carried by a wire line cable or tubing or drilling string.

Still another object of the invention is to provide, in a manner as hereinafter set forth, an improved deep well fishing tool of the above described character which is designed in a novel manner to facilitate the resetting of the tool after a secured fish has been released, without the necessity of having to dismantle the tool.

Still another object of the invention is to provide, in a manner as hereinafter set forth, a fishing tool of the character stated which is so constructed that the secured fish can be released by means of the usual sinkers or jars, when the tool is suspended from a wire line or by a rotary movement of the tool when it is suspended from tubing or drilling string.

Other objects and advantages of the invention will become apparent as the description of the same proceeds and the invention will be best understood from a consideration of the following detailed description taken in connection with the accompanying drawings forming a part of the specification, with the understanding, however, that the invention is not to be limited to the exact details of construction shown and described since obvious modifications will occur to a person skilled in the art.

In the drawings:

Figure 1 illustrates the tool in side elevation, and on a small scale, as carried or suspended by a wire line.

Figure 2 is a side elevation of the tool as shown in Figure 1 with the tool carried upon the lower end of tubing or drilling string.

Figure 3 is a view partly in side elevation and partly in longitudinal section of the tool on an enlarged scale, showing the same set and secured with a shear pin, ready for use when lowered into the well on the wire line.

Figure 4 is a longitudinal sectional view of the tool, with parts partially in elevation, showing the position of the inside parts of the tool after the use of a sinker or jar thereon to effect the severence of the shear pin and showing the mandrel locked in the raised position to which it is moved after the fish has been released from the slips.

Figure 5 is a transverse sectional view taken substantially on the line 5—5 of Figure 4.

Figure 6 is a transverse sectional view taken substantially on the line 6—6 of Figure 4.

Figure 7 is a transverse sectional view taken substantially on the line 7—7 of Figure 4.

Figure 8 is a view partly in side elevation and partly in longitudinal section showing the manner in which the mandrel is locked in elevated position after the tool has been rotated on the lower end of the tubing or drilling string for the release of the fish from the slips.

Figure 9 is a transverse section taken substantially on the line 9—9 of Figure 8.

Referring now more particularly to the drawings the numeral 10 generally designates the body of the tool which comprises a lower cylindrical section 12 and a top cylindrical section 14 which has as an integral part thereof the upwardly extending reduced extension or neck 16.

The entire body of the tool is, of course, tubular and the passage through the lower portion 12 is designated 18 while the passage through the upper portion is designated 20 and, as is clearly shown in Figures 3, 4 and 8 is of somewhat smaller diameter than the passage 18.

The lower end of the upper portion 14 has the reduced lower end extension 22 which is externally screw threaded to thread into the internally threaded upper end of the passage 18 as shown in the several figures, thereby not only coupling the parts together so as to facilitate the introduction thereinto and removal therefrom of the hereinafter described inside portions but to also provide the downwardly facing annular shoulder 22', encircling the extension 22, abuts the upper end of the lower portion 12, for the purpose hereinafter described.

The passage through the extension or neck 16 is slightly enlarged at the upper end and threaded as indicated at 26. This threaded socket is adapted to receive a suitable threaded eye member or ring 28 with which a wire line 30 may be connected as shown in Figure 1 or it may have threaded thereinto the threaded lower end portion of the bottom section of tubing or drilling string 32.

The wall of the passage 20 in the upper section 14 is provided with the annular lock channel 32 and at diametrically opposite sides of the body 14 and opening into the channel 32 are the aligned threaded passages 34 which are closed by the threaded plugs 36.

Directly below and paralleling the aligned passages 34 the body portion 14 has formed therein on a diametrical line the opposing passages 38 which open into the passage 20 and at the outer ends of these passages 38 they are suitably screw threaded to receive the threaded plugs 40.

Slidably positioned in the body of the tool is the elongate tubular mandrel which is generally designated 42 and which has its upper end portion slidably positioned in the passage 20 in which it fits fairly snugly. The lower end of the mandrel 42 carries the collar 44 which provides an upwardly directed shoulder 46 on which rests a washer ring 48.

Extending radially from the collar 44 are pins 50, here shown as three in number, for the purpose hereinafter set forth.

Fixed across the top end of the mandrel 42 is a guide tube 51 which, as shown in Figure 4, has its inner end provided with a centrally apertured wall 52.

The guide tube 51 is designed to receive a locking pin 53 which is employed in one use of the tool and the end of the pin 53 which is directed toward the wall 52, carries the short stem 54 which is of a diameter to enter the aperture in the wall 52.

Within the tube 51 and surrounding the stem 54, is the expansion spring 55 which bears at one end on the wall 52 while its other end bears against the adjacent end of the lock pin as shown and constantly urges the pin to move toward the end of the tube 51 remote from the wall 52.

The top edge of the mandrel 42 has therein the oppositely positioned notches 56. These notches are designed to receive a shear pin 57 which, when the tool is to be lowered on a wire line 30 as shown in Figure 1, is made use of and is inserted through one of the passages 38 to extend across the top end of the mandrel and lie in the notches 56 and have its other end positioned in the opposite passage, the pin being retained in place by the plugs 40.

Figure 3 shows the fishing tool set for lowering into the well on the wire line, where it will be seen that the shear pin 57 extends across the passage 20 and prevents upward movement of the mandrel. In this position, as is also shown, the lock pin 53 is forced inwardly against the resistance of the spring 55 and has its outer end slidably engaged with the wall of the passage 20.

When the mandrel 42 is in this lowered position in the body of the tool and when the mandrel is held down by the shear pin it is ready for the reception of a fish into the lower end opening 12a of the lower portion 12, which opening leads into the short downwardly and inwardly tapering slip chamber 12b and the lower end of the mandrel carries a number of slips 58, here shown as three, each of which is provided with a longitudinal slot 59 in which a pin 50 is loosely engaged.

At the upper ends of the toothed portions 58a of the slips 58 are the inwardly directed flanges 58b which form a stop ring which engages against the upper end of the fish when the tool is lowered thereover.

Interposed between the annular washer 48 and the shoulder 24 and encircling the mandrel above the collar 44, is a spring 60 which constantly urges the slips 50 downwardly.

When the fishing tool is to be used on the lower end of a tubing or drilling string as shown in Figure 2 use is made, in the manner hereinafter set forth, of the L-shaped lock slot 65 which is formed in the wall of the mandrel 42 and comprises the long longitudinally extending leg portion 65a and the shorter horizontal or circumferentially directed leg portion 65b in conjunction with the lock stud 66 which is threaded into a passage 67 in the wall of the portion 14 and projects into the passage 20 to engage in a leg of the slot 65.

In the use of the tool with the wire line 30 the tool is set, as previously stated, with the mandrel 42 held down by the shear pin 57 as shown in Figure 3. The tool is then lowered into the well and the fish is caused to enter the bottom opening 12a and when it enters between the toothed portions 58a of the slips 50 it will engage the lower ends of the toothed portions and force the slips upwardly against the resistance of the spring 60. The slips when moved upwardly from the tapered lower portion or chamber 12b will then be free to open laterally slightly so as to permit the tool to move up farther between the slips and the compressed spring will constantly force the slips down over the end of the fish and as the tool is then raised the spring will force the slips down farther and as they enter the tapered or constricted chamber 12b they will grip the fish so that when the tool is pulled up the fish will be drawn up with it.

If for any reason it becomes necessary to release the fish after it has been gripped by the slips in the manner stated this is accomplished by the used of the usual sinkers and/or drill stem and jars, represented by the member 75, which is run down on the line to force or drive the tool violently downwardly. In so doing the engaged fish will be driven against the flanges 58b so that as the body of the tool moves downwardly the mandrel 42 will be driven upwardly, thus shearing the pin 57 as shown in Figure 4. The mandrel will then rise in the passage of the tool until the lock pin 53 comes into the plane of the circular recess 32 whereupon the spring 55 will force the lock pin into the circular recess to hold the mandrel so that the compressed spring cannot force it downwardly. Consequently the slips will be in a position where they can fall apart slightly and thus release the fish.

When the tool is used on the drilling string or tubing the lock pin 53 and the shear pin are left out of the assembly when the tool is lowered into the well. Thus when the tool engages over the fish in the manner previously stated the fish can be gripped as before described. During this operation the latch finger 68 will be in the upper part of the vertical leg of the L-slot 65. If, however, it becomes necessary or desirable to release the grip upon the fish the drill string is forced downwardly thereby forcing the body 10 of the tool down on the fish and causing the upward movement of the mandrel in the tool body by reason of the engagement of the fish with the slip flanges or stop ring 58b formed by the flanges. This will move the latch finger 66 to the lower end of the vertical leg of the slot 65 whereupon rotary motion can be given to the tool so as to move the finger 66 into the horizontal leg 65b. Thus the mandrel will be locked in its elevated position as illustrated in Figure 8 and the slips will be in the upper part of the tapered portion of the slip chamber 12b where they can separate to the necessary extent to release the fish, thereby permitting the tool to be withdrawn.

It will be seen from the foregoing that the tool constructed in accordance with the present invention may be readily reset when withdrawn from the well, without being entirely disassembled, due to the employment of the oppositely positioned removable threaded plugs 36 and 40 whereby the lock pin 53 can be released so that the mandrel can be dropped down into the lower part of the tool to bring the sheared or cut central part of the shear pin into line with the end portions remaining in the opposite passages 38 where the parts of the shear pin can be pushed out and a new pin inserted.

It will also be seen that the present tool is designed to facilitate the release of a fish without difficulty whether the tool is carried on a wire line or on a tubing string. Such a combination tool is of particular value by reason of the fact that it is often found that a pulling of the fish by the wire line or by tubing is not feasible and therefore a switch from one method to the other can be quickly effected thereby saving valuable time which may mean the difference between saving and losing the well.

I claim:

1. In a fishing tool for wells, an elongate tubular body formed to provide a lower part and an upper part, said upper part having its lower end portion of a reduced diameter and threaded into the upper end portion of the lower part, a mandrel within the body, a plurality of coacting slips within the lower end of said lower part and having a vertical slot in the upper end portion of each, a collar on the lower end of said mandrel and having a diameter to position within the upper ends of said slips, pins projecting radially from said collar engaged in said slots, a washer overlying the top side of said collar and the upper ends of said slips, a coil spring encircling said mandrel between the reduced end of the said upper part and said washer, said mandrel having an L-shaped slot adjacent its upper end, a latch stud carried by the body and normally engaged in the vertical leg of said slot, a shear pin carried by the body in the path of upward movement of said mandrel, a spring actuated locking element carried by the mandrel and engageable in a recess in the body following the shearing of said pin in an upward movement of the mandrel relatively to the body, and means carried by said slips engageable with the fish to free the same from gripping relation therewith upon a forcible downward movement of the body, said slips and the mandrel being forced upwardly relatively to the body of the fish, said pin being sheared during such movement to allow passage of the mandrel until it is sustained in elevated position by the automatic engagement of said locking element in the said recess.

2. The fishing tool as defined in claim 1, with the said means in the form of flanges on the inner sides of said slips immediately below the said slots therein, said flanges closely overlying the top end of the fish when the slips are in fish gripping relation, the pin and slot connections between said collar and the slips allowing for initial upward movement of the latter from gripping engagement with the fish preceding upward movement of the same with the mandrel, during which upward movement said latch stud will move downwardly of the said vertical leg of the L-shaped slot and will engage in the horizontal leg of the same upon a turning motion of the body to sustain the mandrel elevated in unlocked state.

References Cited in the file of this patent

UNITED STATES PATENTS

| Number | Name | Date |
|---|---|---|
| 1,407,878 | Moyer | Feb. 22, 1922 |
| 1,416,930 | Ball | May 23, 1922 |
| 1,428,094 | Immel | Sept. 5, 1922 |
| 1,586,852 | Stalsby | June 1, 1926 |
| 1,787,834 | O'Bannon | Jan. 6, 1931 |
| 1,816,207 | Borgo et al. | July 28, 1931 |
| 1,823,340 | Vance | Sept. 15, 1931 |
| 1,858,500 | Hinderleter | May 17, 1932 |
| 2,026,295 | Baker | Dec. 31, 1935 |
| 2,070,869 | Sorensen | Feb. 16, 1937 |
| 2,094,419 | Shannon | Sept. 28, 1937 |
| 2,098,332 | Church | Nov. 9, 1937 |
| 2,122,602 | Beck | July 5, 1938 |
| 2,281,389 | Shaffer | Apr. 28, 1942 |
| 2,398,515 | Brown et al. | Apr. 16, 1946 |
| 2,410,262 | Breaux | Oct. 29, 1946 |